(12) United States Patent
Sakuda et al.

(10) Patent No.: US 7,296,982 B2
(45) Date of Patent: Nov. 20, 2007

(54) AIR SUPPLY DEVICE

(75) Inventors: Atsushi Sakuda, Ritto (JP); Kiyoshi Sawai, Otsu (JP); Tatsuya Nakamoto, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/560,428

(22) PCT Filed: Jun. 15, 2004

(86) PCT No.: PCT/JP2004/008676

§ 371 (c)(1),
(2), (4) Date: Mar. 17, 2006

(87) PCT Pub. No.: WO2004/111458

PCT Pub. Date: Dec. 23, 2004

(65) Prior Publication Data

US 2006/0177333 A1    Aug. 10, 2006

(30) Foreign Application Priority Data

Jun. 17, 2003    (JP) .............................. 2003-171642

(51) Int. Cl.
*F01C 1/02* (2006.01)
*F03C 2/00* (2006.01)
(52) U.S. Cl. .................. 418/55.1; 418/55.3; 277/392; 277/393; 384/479; 384/482; 384/484

(58) Field of Classification Search ...... 418/55.1–55.3; 464/102; 384/470, 479, 482, 484; 277/392, 277/393, 398, 916
See application file for complete search history.

(56) References Cited

U.S. PATENT DOCUMENTS

| 4,655,617 A | * | 4/1987 | Yasui et al. .................. 384/470 |
| 5,607,240 A | * | 3/1997 | Kajihara et al. ............ 384/484 |
| 5,649,817 A | * | 7/1997 | Yamazaki .................. 418/55.2 |
| 6,887,051 B2 | * | 5/2005 | Sakuda et al. ............. 418/55.2 |

FOREIGN PATENT DOCUMENTS

| JP | 62-59788 | 4/1987 | |
| JP | 02277985 A | * 11/1990 | ................ 418/55.3 |

(Continued)

*Primary Examiner*—Theresa Trieu
(74) *Attorney, Agent, or Firm*—Wenderoth, Lind & Ponack, L.L.P.

(57) ABSTRACT

An air supply device includes a plurality of bearings for rotatably supporting a shaft, a plurality of bearings for rotatably supporting an orbital scroll, and a plurality of bearings for rotatably supporting each of a plurality of rotation constraint members that prevents rotation of the orbital scroll about its own axis, but allows the orbital scroll to orbit relative to a stationary scroll. A grease-filled bearing is used as each of the bearings. Each of the bearings for supporting the orbital scroll includes two sealing materials disposed on respective sides of a plurality of rolling elements, and each of the sealing materials has an inner end held in contact with an inner ring and an outer end held in contact with an outer ring.

10 Claims, 5 Drawing Sheets

FOREIGN PATENT DOCUMENTS

| | | | |
|---|---|---|---|
| JP | 05296168 A | * | 11/1993 |
| JP | 07035064 A | * | 2/1995 |
| JP | 07054784 A | * | 2/1995 |
| JP | 07332264 A | * | 12/1995 |
| JP | 11-190286 | | 7/1999 |
| JP | 2000-161372 | | 6/2000 |
| JP | 2000-297757 | | 10/2000 |
| JP | 2001-73969 | | 3/2001 |
| JP | 2002-70764 | | 3/2002 |
| JP | 2002-130305 | | 5/2002 |

* cited by examiner

AIR SUPPLY DEVICE

TECHNICAL FIELD

The present invention relates to an air supply device that is used as, for example, a supercharger for an engine or an air compressor for a fuel cell.

BACKGROUND ART

In fluid machinery, sliding portions are generally lubricated with oil in order to prevent seizing or abnormal wear or abrasion. Accordingly, a fluid discharged from the fluid machinery is somewhat mixed with the oil, and it is extremely difficult to remove the oil from the fluid. In view of this, use of bearings such as grease-filled ball bearings for the sliding portions has been suggested to perform lubrication only within the bearings for supply of a clean fluid (see, for example, Patent Document 1).

Patent Document 1: Japanese Laid-Open Utility Model Publication No. 62-59788 (pages 9 and 10, FIG. 1)

Use of grease-filled bearings is not limited, to fluid machinery, and they are generally used in various fields including the field of autommotive vehicles, the field of medical machinery and the like. Such grease-filled bearings have two sealing materials disposed on respective sides thereof that prevent grease from being mixed with dust or moisture in an atmosphere. If a grease-filled bearing merely supports a rotational motion, grease filled inside would never leak outside the bearing.

However, in a case of a scroll fluid machine in which an orbital scroll undergoes an orbiting motion relative to a stationary scroll to compress a fluid, the orbiting motion of the orbital scroll is performed with a certain fixed radius and, hence, a centrifugal force acts on bearings mounted on the orbital scroll. Because of this, such a phenomenon occurs that grease filled inside oozes out from an end surface of a sealing material and scatters outside.

Further, of a plurality of bearings located inside a compressor, some are subject to a pressure difference generated between opposite sides thereof, which sometimes promotes leakage of grease. If leakage of grease occurs, not only is reliability of these bearings reduced, but there is also a good chance that fluid discharged is mixed with the grease.

The present invention has been developed to overcome the above-described disadvantages.

It is accordingly an objective of the present invention to provide an air supply device capable of prolonging life of bearings mounted therein, enhancing reliability of the bearings, and supplying clean air without causing any leakage of grease from the bearings.

SUMMARY OF THE INVENTION

In accomplishing the above objective, the air supply device according to the present invention includes a compression mechanism section having a stationary scroll and an orbital scroll held in engagement with each other, and a drive section for driving the compression mechanism section, wherein the compression mechanism section and the drive section have a common shaft, by way of which the orbital scroll is caused to undergo an orbiting motion with respect to the stationary scroll to thereby compress air sucked into the compression mechanism section. The air supply device also includes a plurality of rotation constraint members for preventing rotation of the orbital scroll about its own axis, but allowing the orbital scroll to orbit relative to the stationary scroll, a plurality of first grease-filled bearings for rotatably supporting the common shaft, a plurality of second grease-filled bearings for rotatably supporting the orbital scroll, and a plurality of third grease-filled bearings for rotatably supporting each of the rotation constraint members. Each of the second bearings has an outer ring, an inner ring, a plurality of rolling elements interposed between the outer and inner rings, and two sealing materials disposed on respective sides of the plurality of rolling elements. Each of the sealing materials has an inner end held in contact with the inner ring and an outer end held in contact with the outer ring.

According to the present invention, because the bearings employed in the air supply device are of a grease-filled type, no oil is needed for lubrication of sliding portions and, hence, air discharged from the air supply device is mixed with no oil mist, thereby making it possible to supply clean air. Further, because the inner ring and the outer ring of the bearings are assuredly sealed by the sealing materials, even if a centrifugal force acts on grease inside the bearings upon an orbiting motion of the orbital scroll with a fixed radius, scattering of the grease is avoided, thereby making it possible to prolong life of the bearings and enhance reliability of the bearings.

Where each of the sealing materials for the second bearings has an inner bent portion that has been bent towards a low-pressure side from a high-pressure side, and the inner bent portion is held in contact with the inner ring, compressed high-pressure air is further prevented from leaking into a suction chamber via a central portion of the orbital scroll. As to the low-pressure side, even if a temperature or pressure inside the bearings increases during operation, leakage of the grease from inside to outside is avoided.

If one of acrylic rubber, Teflon rubber and fluoro rubber is used for the sealing materials, hardening that may be caused by heat is reduced, thereby enabling a high-speed operation and an increase in an amount of supply air. In addition, an amount of leakage of grease can be further suppressed.

Each of the rotation constraint members may include a crankpin having an insertion portion inserted into an associated one of the third bearings, wherein the insertion portion has a groove defined in a surface thereof so as to extend parallel to a longitudinal axis thereof. Alternatively, the orbital scroll or a casing may have a plurality of recesses defined therein into each of which one of the third bearings is press fitted, wherein each of the plurality of recesses has a groove defined in an inner surface thereof so as to extend parallel to a longitudinal axis of an associated one of the rotation constraint members. In such case, the groove comes to act as an air escape passageway when the rotation constraint members are assembled with the orbital scroll, thereby causing no closed spaces during assemblage and facilitating assemblage of the rotation constraint members.

If a width and depth of the groove are both set to a value ranging from 0.1 mm to 1.0 mm, the insertion portion of the crankpin, or a recess into which the insertion portion is engaged, is not deformed by a load applied during operation, and at the same time the groove can satisfactorily achieve its function as an air escape groove.

DETAILED DESCRIPTION OF THE PREFERRED EMBODIMENTS

A preferred embodiment of the present invention is discussed hereinafter with reference to the drawings.

Figure 1:
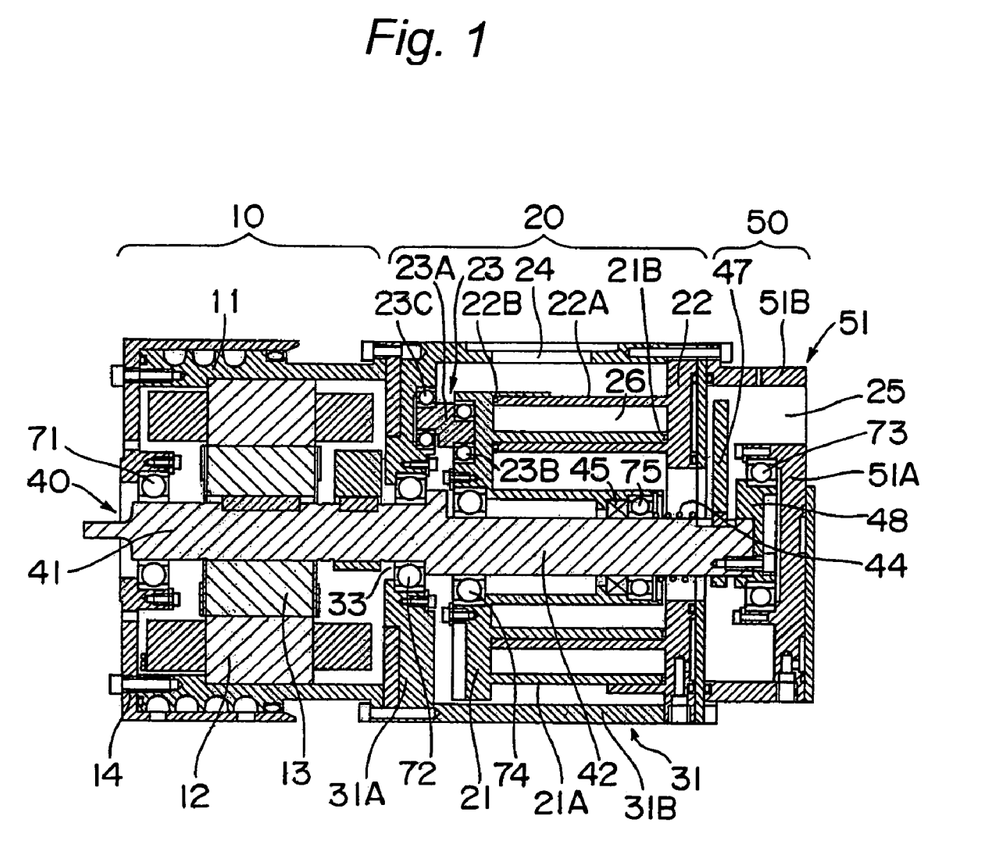
FIG. 1 is a sectional view taken along a longitudinal axis of an air supply device according to the present invention.

FIG. 1 is a sectional view taken along a longitudinal axis of an air supply device according to the present invention, particularly depicting a general construction of the air supply device.

As shown in FIG. 1, the air supply device according to the present invention includes a drive section (motor section) 10, a compression mechanism section 20, and a discharge casing section 50.

The drive section 10 includes a cylindrical motor frame 11, a stator 12 secured to an inner surface of the motor frame 11, a rotor 13 secured to a motor shaft 41 to rotate within the stator 12, and a motor bearing plate 14 for closing one end of the motor frame 11. The motor bearing plate 14 includes a first bearing 71 secured thereto at a central portion thereof, which in turn rotatably supports one end of the motor shaft 41.

The compression mechanism section 20 includes an orbital scroll 21 operated by action of an orbital shaft 42, a stationary scroll 22 for forming a plurality of compression chambers 26 between it and the orbital scroll 21, and a plurality of rotation constraint members 23 operable to orbit the orbital scroll 21. The orbital scroll 21 has an orbital scroll wrap 21A unitarily formed with an end plate and having a predetermined height, while the stationary scroll 22 has a stationary scroll wrap 22A unitarily formed with an end plate and having a predetermined height. The orbital scroll wrap 21A and the stationary scroll wrap 22A are positioned so as to engage each other.

A clearance is provided between a side surface of the orbital scroll wrap 21A and that of the stationary scroll wrap 22A so that they may not be brought into contact with each other. The orbital scroll wrap 21A and the stationary scroll wrap 22A are each provided at an end surface thereof with a tip seal 21B or 22B, respectively. Accordingly, the end surface of the orbital scroll wrap 21A is held in contact with the stationary scroll 22 by way of the tip seal 21B, while the end surface of the stationary scroll wrap 22A is held in contact with the orbital scroll 21 by way of the tip seal 22B.

The compression mechanism section 20 includes a casing 31 that is made up of a disc-shaped partition plate 31A for sealingly partitioning another end of the motor frame 11 and one end of the compression mechanism section 20 from each other, and a cylindrical member 31B for covering component parts accommodated in the casing 31. The partition plate 31A has a through-hole 33 defined therein at a central portion thereof, in which a second bearing 72 is received to rotatably support another end of the motor shaft 41. The cylindrical member 31B has a suction port 24 defined therein, through which air is introduced into the compression mechanism section 20.

The discharge casing section 50 includes a discharge casing 51 that in turn includes a disc-shaped plate 51A and a cylindrical member 51B secured to or otherwise integrally formed with an outer peripheral portion of the plate 51A. The plate 51A is provided with a third bearing 73 secured thereto at a central portion thereof. An adapter 48 is secured to another end of the orbital shaft 42 and rotatably supported by the third bearing 73 with a center of the adapter 48 held in alignment with a rotational center of the motor shaft 41. The plate 51A has a discharge port 25 defined therein, through which air compressed by the compression mechanism section 20 is discharged.

Bearings 71, 72 and 73 are first grease-filled bearings.

The rotation constraint members 23 are operable to prevent the orbital scroll 21 from rotating about the orbital shaft 42, but allow the orbital scroll 21 to orbit around a longitudinal axis of the motor shaft 41. More specifically, each rotation constraint member 23 includes a crankpin 23A interposed between the casing 31 and the orbital scroll 21, and the crankpin 23A is provided with bearings 23B, 23C that rotatably support opposite ends of the crankpin 23A, respectively. A grease-filled ball bearing is preferably used as the bearings 23B, 23C, which are third grease-filled bearings. Plural (for example, three) crankpins 23A are interposed between the partition plate 31A and the orbital scroll 21, and are equally spaced from the orbital shaft 42 and also from each other.

A rotary shaft 40 is made up of the motor shaft 41 and the orbital shaft 42 unitarily formed with each other and both referred to above. The rotary shaft 40 is rotatably supported at one end thereof by the first bearing 71, at an intermediate portion thereof by the second bearing 72, and at another end thereof by the third bearing 73 via the adapter 48. Because the motor shaft 41 is supported by the first bearing 71 and the second bearing 72 and because the orbital shaft 42 is supported by the second bearing 72 and the third bearing 73, both the motor shaft 41 and the orbital shaft 42 are of a construction supported at opposite ends thereof. The rotary shaft 40 is crank-shaped; that is, the orbital shaft 42 is eccentric with respect to the motor shaft 41.

The orbital shaft 42 is provided with two bearings 74, 75 mounted thereon, by which the orbital scroll 21 is rotatably supported. The bearing 74 is located on a root side of the orbital scroll wrap 21A, while the bearing 75 is located on a distal end side of the orbital scroll wrap 21A. Bearings 74 and 75 are second grease-filled bearings.

The orbital shaft 42 is also provided with a pre-loading spring 44 interposed between a balance weight 47 and the bearing 75 under a condition in which a compression load is applied thereto. Accordingly, the pre-loading spring 44 presses an inner ring of the bearing 75 towards the drive section 10, and a load applied to the inner ring is transmitted to an outer ring of the bearing 75 via balls, thereby pressing the orbital scroll 21 towards the drive section 10. A load applied to the orbital scroll 21 is received by the crankpins 23A to prevent the orbital scroll 21 from overturning during a low-speed operation, thereby suppressing vibrations.

The orbital shaft 42 is provided with a shaft seal 45 juxtaposed with the bearing 75 at a location between the bearing 74 and the bearing 75. The shaft seal 45 is intended to prevent compressed air from leaking to a side of the bearing 74.

In the air supply device of the above-described construction, where clean air is required, lubrication of sliding portions is of great importance. Use of an oil is advantageous for the lubrication, but air discharged from the air supply device comes to contain an oil mist. Accordingly, a filter is needed to remove such oil mist. Further, because the oil is gradually discharged, periodical oil feed must be performed.

In view of the above, the air supply device according to the present invention employs grease-filled bearings as the first bearing 71, the second bearing 72, the third bearing 73, the bearings 74, 75 and the bearings 23B, 23C. Use of such bearings confines the sliding portions to only inside the bearings, which is lubricated by grease, thereby making it possible to supply clean air.

A case where ball bearings are employed as the bearings referred to above is discussed hereinafter.

Figure 2:
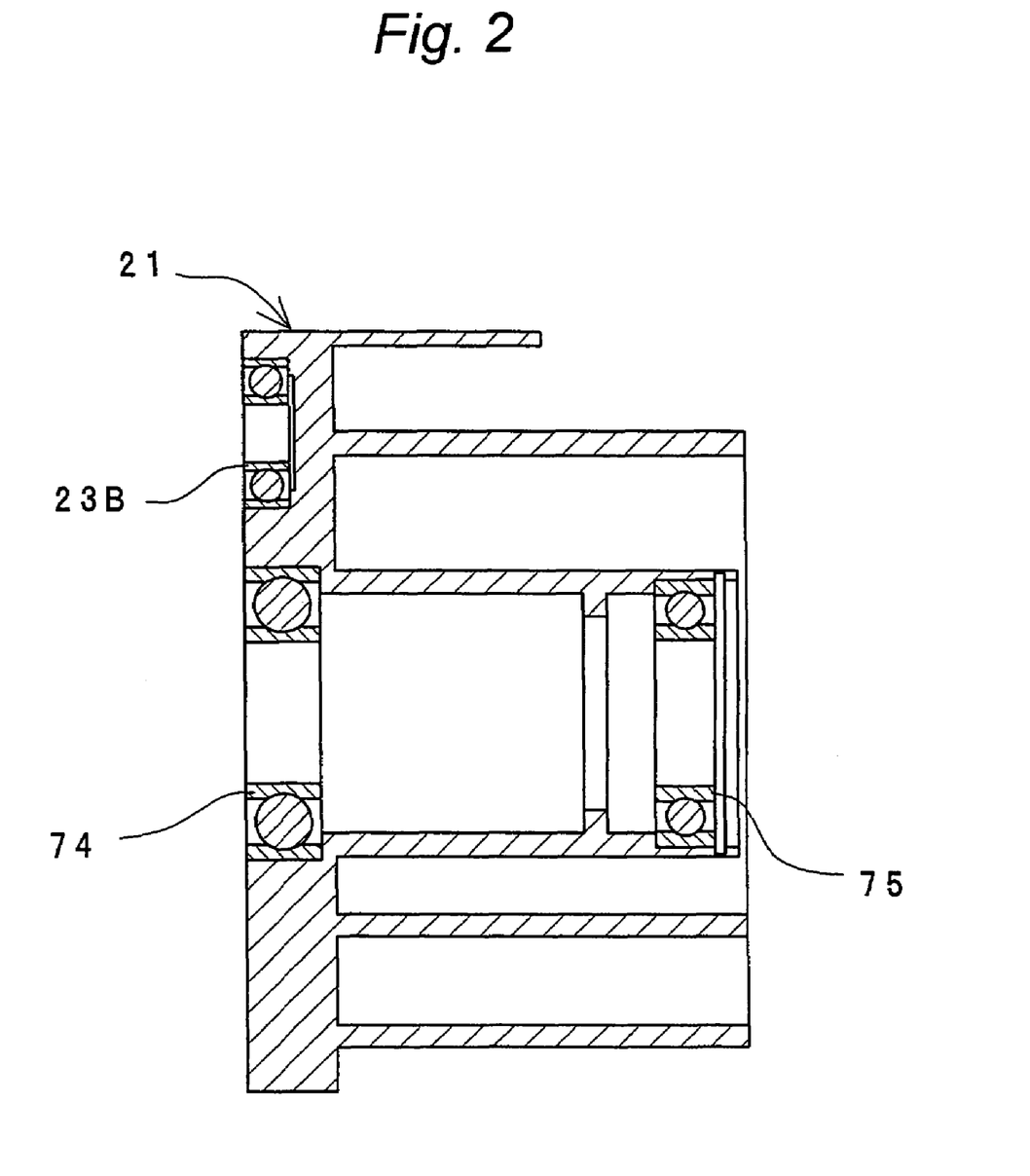
FIG. 2 is a sectional view taken along a longitudinal axis of an orbital scroll mounted in the air supply device of FIG. 1.

FIG. 2 is a sectional view taken along a longitudinal axis of the orbital scroll 21, and as shown therein, the orbital scroll 21 is provided with two bearings 74, 75 mounted on the orbital shaft 42, and a plurality of bearings 23B each constituting a rotation constraint member 23.

Figure 3:
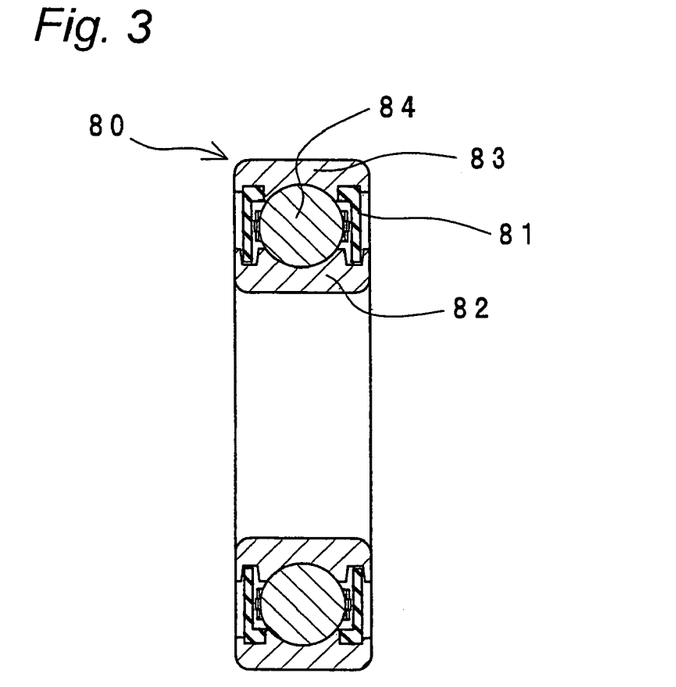
FIG. 3 is a sectional view taken along an axial center of one of a plurality of bearings mounted in the air supply device of FIG. 1.

FIG. 3 depicts one of the bearings 74, 75, 23B referred to above, and an internal construction of the bearing, generally identified by 80, is explained hereinafter with reference to FIG. 3.

The bearing 80 is internally filled with grease, on which a centrifugal force acts during operation, which in turn acts to render the grease to leak outside the bearing 80. In particular, in applications where a clearance is present between sealing materials 81, mounted on respective sides of a plurality of rolling elements 84 of the bearing 80, and an inner ring 82 or an outer ring 83 of the bearing 80, the grease scatters outside, resulting in a reduction in life of the bearing 80.

In practice of the present invention, each sealing material 81 mounted in the bearing 80 has a generally L-shaped section taken along an axial center of the bearing 80, and also has inner and outer ends held in contact with the inner ring 82 and the outer ring 83 of the bearing 80, respectively. When the sealing material 81 is held in contact with the inner ring 82 and the outer ring 83 of the bearing 80, an interior and exterior of the bearing 80 are partitioned without any gap and, hence, even if a centrifugal force acts on grease inside the bearing 80, leakage of the grease is avoided.

As can be seen from the general construction of FIG. 1, in the air supply device according to the present invention, compressed high-pressure air is present around the distal end portion of the orbital scroll 21, while intake air of atmospheric pressure is present around the end plate of the orbital scroll 21. The high-pressure air flows towards the discharge casing section 50 and is then discharged outside via the discharge port 25. However, part of the high-pressure air flows towards the end plate from the distal end portion after passing through a central portion of the orbital scroll 21. In order to prevent leakage of such high-pressure air, the shaft seal 45 is provided inside the orbital scroll 21 at a central portion thereof. However, use of the shaft seal 45 generally requires additional power because the shaft seal 45 is held in strong contact with the orbital shaft 42.

Figure 4:
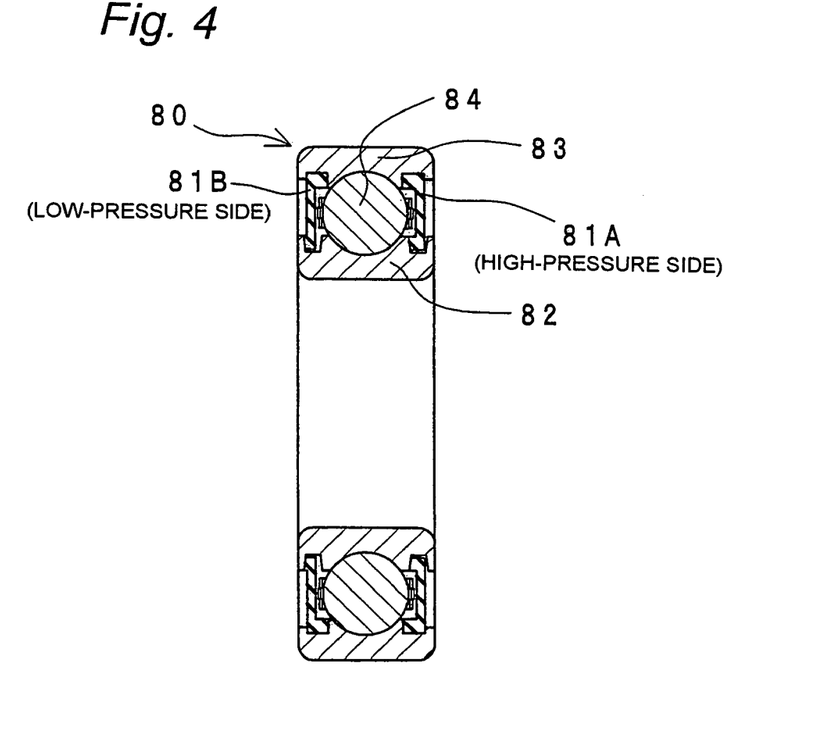
FIG. 4 is a sectional view taken along an axial center of a modified form of the bearing of FIG. 3.

In practice of the present invention, as shown in FIG. 4, a sealing material 81A intended for external pressure may be used as a high-pressure side sealing material of the bearing 80, while a sealing material 81B intended for internal pressure may be used as a low-pressure side sealing material of the bearing 80.

More specifically, the sealing material 81A facing high-pressure air has bent portions formed at inner and outer end portions thereof, which bent portions have been bent towards the low-pressure side so that an end of an inner bent portion may be brought into closer contact with the inner ring 82 as atmospheric pressure increases. On the other hand, the sealing material 81B facing low-pressure air has an inner bent portion that has been bent towards the low-pressure side, contrary to an outer bent portion, so that an end of the inner bent portion may be brought into closer contact with the inner ring 82 as internal pressure of the bearing 80 increases.

Because this construction plays a role of the shaft seal 45, the shaft seal 45 as shown in FIG. 1 can be removed to eliminate a requirement of additional power, thereby making it possible to increase efficiency. Also, sealing properties increase with an increase in pressure and, hence, leakage of grease within the bearing can be considerably reduced.

When the sealing material 81 is positively brought into contact with the inner ring 82 to enhance sealing properties, heat is inevitably generated, which in turn reduces life of the sealing material 81. Because the sealing material 81 becomes hard depending on a temperature, it is important to select rubber having a high heat resistance. Accordingly, acrylic rubber, Teflon rubber or fluoro rubber is preferably used for the sealing material 81. Although heat resistance increases in the order of acrylic rubber, Teflon rubber and fluoro rubber, it is preferred that a maximum speed be set as one standard for selection.

In applications where all seals mounted in the orbiting scroll 21 are of a contact type, a difficulty is encountered in assembling rotation constraint member 23. That is, as shown in FIG. 1, the bearing 23B forming a rotation constraint member 23 is press fitted into a recess formed in a rear surface of the end plate of the orbital scroll 21, while the bearing 23C similarly forming another rotation constraint member 23 is press fitted into a recess formed in the partition plate 31A and, hence, a rear surface of each bearing 23B, 23C does not communicate with the outside. If a contact type bearing is employed in the air supply device according to the present invention, air is confined to the inside when the crankpin 23A is engaged in the bearing, and an escape port is accordingly needed.

Figure 5A:
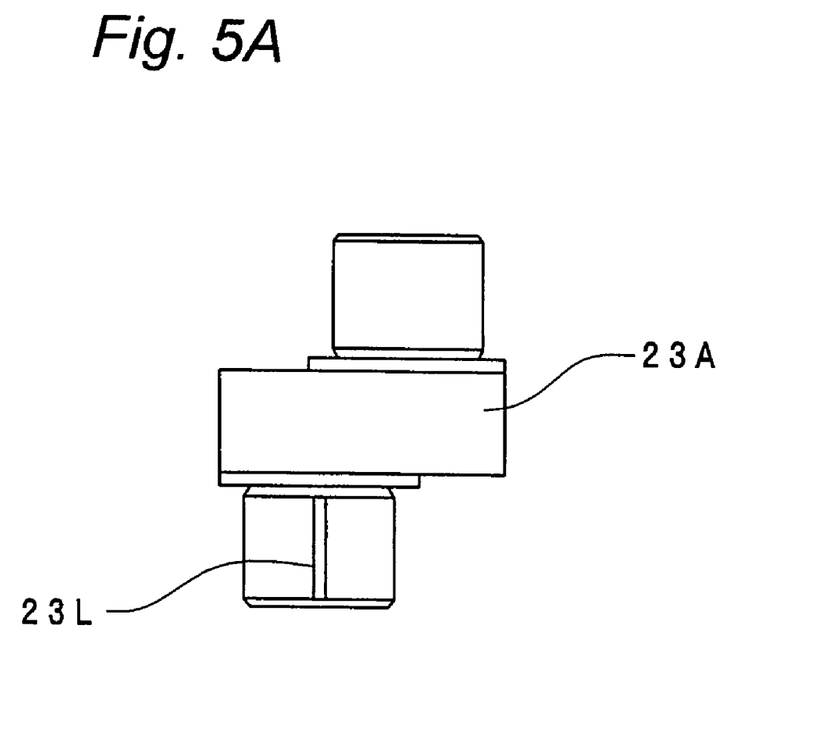
FIG. 5A is a front view of a crankpin forming a rotation constraint member mounted in the air supply device of FIG. 1.
Figure 5B:
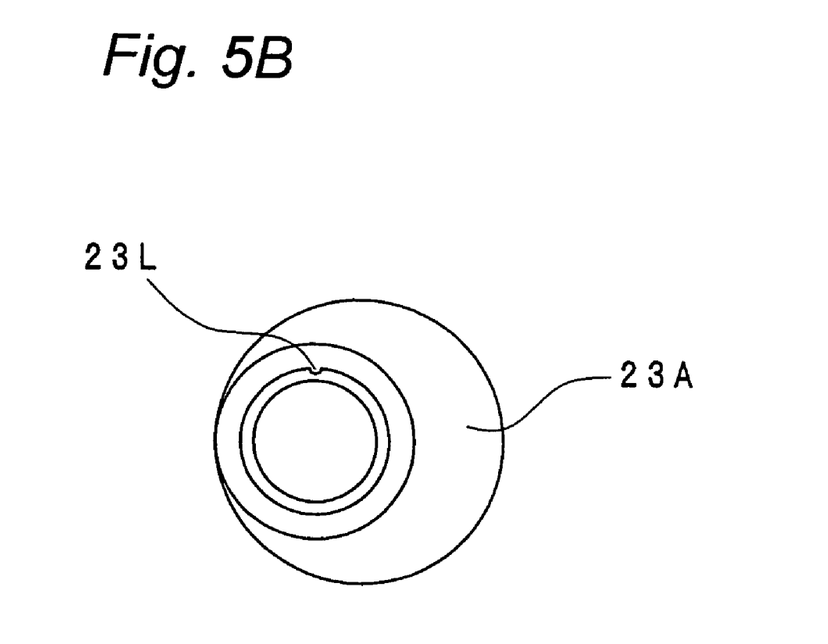
FIG. 5B is a side view of the crankpin of FIG. 5A.

In practice of the present invention, as shown in FIGS. 5A and 5B, the crankpin 23A has two shafts formed on respective sides thereof for insertion into respective bearings, and each shaft has a groove 23L defined in a surface thereof so as to extend parallel to a longitudinal axis thereof. By this construction, when a shaft of the crankpin 23A is inserted into an associated bearing, air confined by these members is discharged outside through the groove 23L, thus facilitating assemblage of rotation constraint member 23. Also, because a space delimited by the shaft of the crankpin 23A and the bearing communicates always with outside air, and pressure in the former and pressure of the latter are equalized, even if a temperature change occurs upon operation or stoppage of the air supply device, a pressure change of air confined by the bearing 23B and the crankpin 23A is suppressed.

Figure 6:
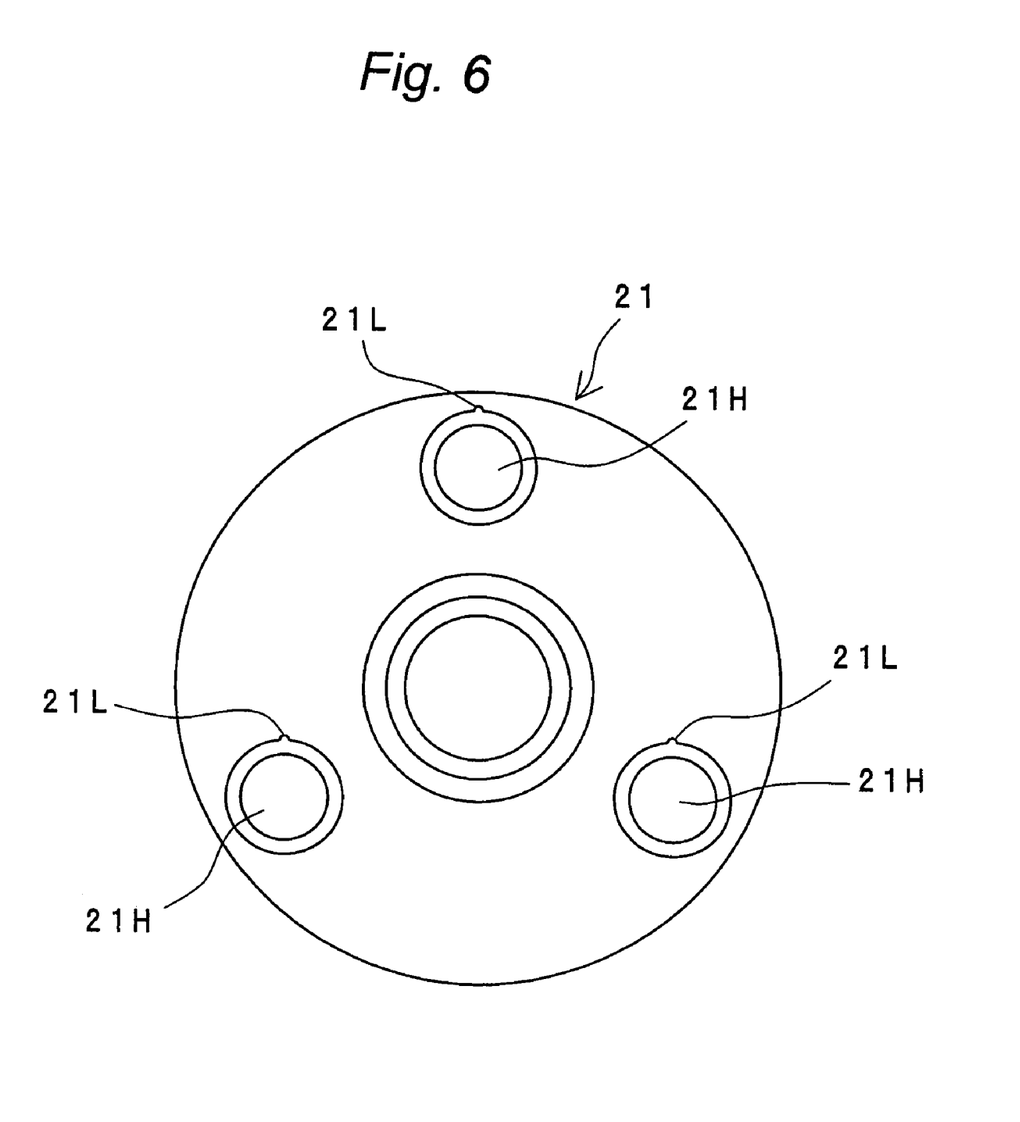
FIG. 6 is a rear view of the orbital scroll of FIG. 2.

In place of air escape groove 23L formed in the shaft (insertion portion) of the crankpin 23A, an engagement recess 21H formed in the end plate of the orbital scroll 21 for insertion of the bearing 23B thereinto may have a groove 21L formed in an inner surface thereof so as to extend parallel to a longitudinal axis of a shaft of the crankpin 23A, as shown in FIG. 6, or an engagement recess formed in the casing 31 (partition plate 31A) may similarly have a groove formed in an inner surface thereof so as to extend parallel to the longitudinal axis of the shaft of the crankpin 23A. By this construction, air so confined is discharged outside through the groove 21L, thus facilitating assemblage of rotation constraint member 23.

It is preferred that air escape groove 21L, 23L has a width and a depth both in a range of 0.1 mm to 1.0 mm. If the groove is too large (if the width or depth of the groove exceeds 1.0 mm), there is a possibility that the crankpin 23A, the engaging portion 21H of the orbital scroll 21, or an engaging portion of the casing 31 is reduced in strength and cannot withstand a load during operation, though such a groove is preferable as an air escape groove. In contrast, if the groove is too small (if the width or depth of the groove is less than 0.1 mm), there is a possibility that the groove cannot achieve a sufficient function as an air escape groove. Accordingly, by setting the width and depth of the air escape groove 21L, 23L in the range referred to above, it is possible to ensure strength of the crankpin 23A, engaging portion 21H of the orbital scroll 21 or the engaging portion of the casing 31, and a function as an air escape groove at the same time.

The invention claimed is:

1. An air supply device comprising:
    a compression mechanism section having a stationary scroll and an orbital scroll held in engagement with each other;
    a drive section for driving said compression mechanism section, said compression mechanism section and said drive section having a common shaft for causing said orbital scroll to undergo an orbiting motion with respect to said stationary scroll and thereby compress air sucked into said compression mechanism section;
    rotation constraint members for preventing rotation of said orbital scroll about its own axis, while allowing said orbital scroll to orbit relative to said stationary scroll;
    first grease-filled bearings for rotatably supporting said common shaft;
    second grease-filled bearings for rotatably supporting said orbital scroll, each of said second grease-filled bearings having
        (i) an outer ring,
        (ii) an inner ring,
        (iii) rolling elements interposed between said outer ring and said inner ring, and
        (iv) two sealing materials disposed on respective sides of said rolling elements, each of said two sealing materials having
            (a) an inner portion held in contact with said inner ring, said inner portion being been bent towards a low-pressure side from a high-pressure side, and
            (b) an outer end held in contact with said outer ring; and
    third grease-filled bearings for rotatably supporting each of said rotation constraint members.

2. The air supply device according to claim 1, wherein each of said two sealing materials comprises one of acrylic rubber, Teflon rubber and fluoro rubber.

3. The air supply device according to claim 2, wherein each of said rotation constraint members comprises a crankpin having an insertion portion inserted into an associated one of said third grease-filled bearings, said insertion portion having a groove in a surface thereof so as to extend parallel to a longitudinal axis of said insertion portion.

4. The air supply device according to claim 3, wherein said groove has a width and a depth both in a range of 0.1 mm to 1.0 mm.

5. The air supply device according to claim 2, wherein said compression mechanism section has recesses defined therein, with a groove being in a surface defining each of said recesses, and with each of said third grease-filled bearings being press fitted into a corresponding one of said each of said recesses such that said groove extends parallel to a longitudinal axis of an associated one of said rotation constraint members.

6. The air supply device according to claim 5, wherein said groove has a width and a depth both in a range of 0.1 mm to 1.0 mm.

7. The air supply device according to claim 1, wherein each of said rotation constraint members comprises a crankpin having an insertion portion inserted into an associated one of said third grease-filled bearings, said insertion portion having a groove in a surface thereof so as to extend parallel to a longitudinal axis of said insertion portion.

8. The air supply device according to claim 7, wherein said groove has a width and a depth both in a range of 0.1 mm to 1.0 mm.

9. The air supply device according to claim 1, wherein said compression mechanism section has recesses defined therein, with a groove being in a surface defining each of said recesses, and with each of said third grease-filled bearings being press fitted into a corresponding one of said each of said recesses such that said groove extends parallel to a longitudinal axis of an associated one of said rotation constraint members.

10. The air supply device according to claim 9, wherein said groove has a width and a depth both in a range of 0.1 mm to 1.0 mm.

* * * * *

UNITED STATES PATENT AND TRADEMARK OFFICE
CERTIFICATE OF CORRECTION

PATENT NO.         : 7,296,982 B2
APPLICATION NO. : 10/560428
DATED              : November 20, 2007
INVENTOR(S)        : Atsushi Sakuda et al.

It is certified that error appears in the above-identified patent and that said Letters Patent is hereby corrected as shown below:

On the Title Page.

In Section (54), line 1, change "AIR SUPPLY DEVICE" to --AN AIR SUPPLY DEVICE HAVING SEALANT ATTACHED TO BOTH SIDES OF ROLLING ELEMENTS OF BEARING SUPPORTING AN ORBITAL SCROLL--.

Signed and Sealed this

Nineteenth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,296,982 B2 | Page 1 of 1 |
| APPLICATION NO. | : 10/560428 | |
| DATED | : November 20, 2007 | |
| INVENTOR(S) | : Atsushi Sakuda et al. | |

It is certified that error appears in the above-identified patent and that said Letters Patent is hereby corrected as shown below:

On the Title Page.

In Section (54), line 1, and Column 1, line 1, change "AIR SUPPLY DEVICE" to --AN AIR SUPPLY DEVICE HAVING SEALANT ATTACHED TO BOTH SIDES OF ROLLING ELEMENTS OF BEARING SUPPORTING AN ORBITAL SCROLL--.

This certificate supersedes the Certificate of Correction issued August 19, 2008.

Signed and Sealed this

Sixteenth Day of September, 2008

JON W. DUDAS
*Director of the United States Patent and Trademark Office*